United States Patent
Iwamoto

(10) Patent No.: US 8,667,022 B2
(45) Date of Patent: Mar. 4, 2014

(54) ADJUSTMENT APPARATUS, ADJUSTMENT METHOD, AND RECORDING MEDIUM OF ADJUSTMENT PROGRAM

(75) Inventor: Shouji Iwamoto, Yamato (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/557,309

(22) Filed: Jul. 25, 2012

(65) Prior Publication Data

US 2013/0031062 A1 Jan. 31, 2013

(30) Foreign Application Priority Data

Jul. 29, 2011 (JP) .................. 2011-167783

(51) Int. Cl.
*G06F 17/30* (2006.01)
(52) U.S. Cl.
USPC ........... 707/791; 707/802; 707/814; 707/822; 707/828
(58) Field of Classification Search
USPC ................. 707/600–899
See application file for complete search history.

(56) References Cited

U.S. PATENT DOCUMENTS

| | | |
|---|---|---|
| 2006/0015521 A1 | 1/2006 | Howey et al. |
| 2008/0281849 A1 | 11/2008 | Mineno |
| 2012/0310874 A1 * | 12/2012 | Dantressangle et al. ...... 707/600 |

FOREIGN PATENT DOCUMENTS

| | | |
|---|---|---|
| JP | 2006-31687 | 2/2006 |
| WO | WO 2007/083371 | 7/2007 |

* cited by examiner

*Primary Examiner* — Isaac M Woo
(74) *Attorney, Agent, or Firm* — Staas & Halsey LLP

(57) ABSTRACT

An adjustment method includes reading a record that includes a plurality of columns from a storage unit, determining whether data stored in a certain column in the plurality of columns of the read record has an attribute that corresponds to another column in the plurality of columns when the data does not have an attribute that corresponds to the certain column, and assigning the data to the another column when it is determined that the data has the attribute that corresponds to the another column.

9 Claims, 20 Drawing Sheets

FIG. 4

| FAMILY NAME | GIVEN NAME | ADDRESS | HOME TELEPHONE NUMBER | CELLULAR PHONE NUMBER | } DATA SCHEMA |
|---|---|---|---|---|---|
| TOKKYO | ICHIRO | TOKYO··· | 044-1234··· | | |
| SUZUKI | HANAKO | SHIZUOKA-KEN... | | 090··· | CLEANSING TARGET DATA |
| YAMADA TARO | | KANAGAWA-KEN··· | 080··· | | |
| ··· | ··· | ··· | ··· | ··· | |

FIG. 5

| FOR FIRST COLUMN | FOR SECOND COLUMN | FOR THIRD COLUMN | FOR FOURTH COLUMN | ... |
|---|---|---|---|---|
| FAMILY NAME | ... | ... | TO BE CONSTITUTED BY [0 TO 9] AND SYMBOLS "-" AND "+" | ... |
| GIVEN NAME | ... | ... | HOME TELEPHONE NUMBER (0[1-7]X[-]X[-]XXXX[-]XXXX) | ... |
| FULL NAME | ... | ... | INTERNATIONAL TELEPHONE NUMBER (+81X[-]X[-]XXXX[-]XXXX) | ... |
|  | ... | ... | CELLULAR PHONE NUMBER (090[-]XXXX[-]XXXX) | ... |
|  | ... | ... | CELLULAR PHONE NUMBER (080[-]XXXX[-]XXXX) | ... |
|  | ... | ... | PHS NUMBER(070[-]XXXX[-]XXXX) | ... |

FIG. 6

| (FAMILY NAME) | (GIVEN NAME) | (ADDRESS) | ... |
|---|---|---|---|
| CHARACTER TYPE | CHARACTER TYPE | CHARACTER TYPE | ... |
| FORMAT | FORMAT | FORMAT | ... |
| MAXIMUM LENGTH | MAXIMUM LENGTH | MAXIMUM LENGTH | ... |
|  |  |  | ... |
| SATO | TARO | CHIYODA-KU, TOKYO | ... |
| TOKKYO | KAZUO | ADACHI-KU, TOKYO | ... |
| SUZUKI | ICHIRO | OSAKA-SHI, OSAKA-FU | ... |
| ... | ... | ... | ... |

FIG. 7

| (FAMILY NAME) | (GIVEN NAME) | (FULL NAME) | (ADDRESS) | ... | (CELLULAR PHONE NUMBER) | ... |
|---|---|---|---|---|---|---|
| SATO | TARO | SATO/TARO | HOKKAIDO... | ... | 080xxxxxxx | ... |
| TOKKYO | KAZUO | SATO/HANAKO | AOMORI-KEN... | ... | | ... |
| SUZUKI | ICHIRO | SATO/ICHIRO | AKITA-KEN... | ... | | ... |
| YAMADA | HANAKO | ... | ... | | | |
| TANAKA | JIRO | ... | TOKYO... | | | |
| KONDO | SABURO | YAMADA/TARO | KANAGAWA-KEN... | | | |
| ... | ... | ... | | | | |

FIG. 8

| FAMILY NAME | GIVEN NAME | ADDRESS | HOME TELEPHONE NUMBER | CELLULAR PHONE NUMBER | ... | } DATA SCHEMA |
|---|---|---|---|---|---|---|
|  |  |  |  |  |  | } CLEANSED DATA |

FIG. 12

| FAMILY NAME | GIVEN NAME | ADDRESS | HOME TELEPHONE NUMBER | CELLULAR PHONE NUMBER |
|---|---|---|---|---|
| TOKKYO | ICHIRO | TOKYO··· | 0441234··· | |
| SUZUKI | HANAKO | SHIZUOKA-KEN··· | | 090··· |
| YAMADA | TARO | KANAGAWA-KEN··· | | 080··· |
| ··· | ··· | ··· | ··· | ··· |

- Header row: DATA SCHEMA
- Data rows: CLEANSED DATA

ADJUSTMENT APPARATUS, ADJUSTMENT METHOD, AND RECORDING MEDIUM OF ADJUSTMENT PROGRAM

CROSS-REFERENCE TO RELATED APPLICATION

This application is based upon and claims the benefit of priority of the prior Japanese Patent Application No. 2011-167783, filed on Jul. 29, 2011, the entire contents of which are incorporated herein by reference.

FIELD

The embodiments discussed herein are related to adjustment of data.

BACKGROUND

As a process for improving the quality of data stored in a database (DB) before the data is used, data cleansing is performed in a name aggregation process or the like. In data cleansing, useless garbled data is deleted and styles of data included in the same column are made consistent.

For example, in data cleansing, when data representing a full name such as "TOKKYO Taro" is included in a column "family name", this data is deleted. Furthermore, in data cleansing, when data representing "090-xxx-xxxx" and data representing "090yyyyyyy", which have different styles from each other, are stored in a column called "cellular phone number", all the data are standardized so that the symbol "-" is not included in cellular phone numbers.

Furthermore, a data integration apparatus that executes data cleansing and mapping when data is transmitted and received between different systems has been widely used. The data cleansing that the data integration apparatus performs includes deletion of blank space in data, deletion of linefeed codes in data, conversion of units, conversion of character strings, standardizing era names, and standardizing numbers of significant figures. Furthermore, the data integration apparatus generates a mapping definition of the mapping in accordance with the data structure of the copy source and the configuration of the data structure of the copy destination, and stores the copy source data that has been subjected to data cleansing in the copy destination in accordance with the mapping definition.

For example, in the related art, data cleansing is executed assuming that data is stored in accordance with a schema for a corresponding column, that is, assuming that specific data is stored in the column. Therefore, in the related art, if there is data to be stored in a certain column but the data is stored in the wrong column, the data is deleted as noise.

Furthermore, in mapping in the related art, because a mapping definition is generated in accordance with the copy source's schema and the copy destination's schema, data stored in an incorrect column is stored in the copy destination without correction.

SUMMARY

According to an aspect of the invention, an adjusting method includes reading a record that includes a plurality of columns from a storage unit, determining whether data stored in a certain column in the plurality of columns of the read record has an attribute that corresponds to another column in the plurality of columns when the data does not have an attribute that corresponds to the certain column, and assigning the data to the another column when it is determined that the data has the attribute that corresponds to the another column.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of information stored in a cleansing target DB;

FIG. 5 is a diagram illustrating an example of information stored in an attribute determination order definition document DB;

FIG. 6 is a diagram illustrating an example of information stored in an attribute determination dictionary DB;

FIG. 7 is a diagram illustrating an example of information stored in a cleansing dictionary DB;

FIG. 8 is a diagram illustrating an example of information stored in a post-cleansing DB;

FIG. 12 is a diagram illustrating an example of adjustment;

DESCRIPTION OF EMBODIMENTS

Hereinafter, embodiments of an adjustment program, an adjustment method, and an adjustment apparatus according to the present disclosure are described in detail with reference to the accompanying drawings. The present disclosure is not limited to these embodiments.

Figure 1:
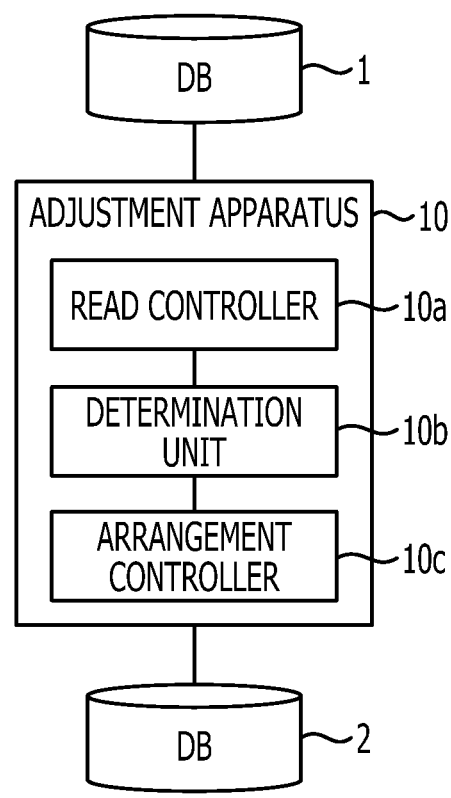
FIG. 1 illustrates an example of a configuration of a system of a first embodiment.

FIG. 1 is a diagram illustrating a configuration of a system according to a first embodiment. As illustrated in FIG. 1, the system includes a DB 1, a DB 2, and an adjustment apparatus 10. The adjustment apparatus 10 and the DB 1 are connected to each other through a network, and similarly, the adjustment apparatus 10 and the DB 2 are also connected to each other through a network. Note that, although an example in which the adjustment apparatus 10 and each of the DBs 1 and 2 are connected to each other through a network is described as an example in this embodiment, the present disclosure is not limited to this, and the adjustment apparatus 10 may incorporate the DBs 1 and 2 therein. Furthermore, although an example wherein a DB for storing data cleansing targets and a DB for storing cleansed data are different from each other is described in this embodiment, the present disclosure is not limited to this, and the same DB may be used.

The DB 1 is a database that includes records formed by a plurality of columns and stores data that the adjustment apparatus 10 has determined to be adjustment targets. The DB 2 is a database that includes a data schema specified by, for example, a user and stores data adjusted by the adjustment apparatus 10.

The adjustment apparatus 10 includes a read controller 10a, a determination unit 10b, and an arrangement controller 10c. For example, the adjustment apparatus 10 is a server apparatus that determines attributes of data included in each record included in DB 1 and shifts the data from DB 1 to DB 2 as part of the adjustment process.

The read controller 10a reads a record that includes a plurality of columns from the DB 1. When data stored in one of the columns of the record read by the read controller 10a does not have an attribute that corresponds to the column, the determination unit 10b determines whether an attribute of the data corresponds to one of the other columns. As a result, when determining that an attribute of the data corresponds to another column, the arrangement controller 10c assigns the data to the column. For example, for each piece of data from the columns for a record read from DB 1, the arrangement controller 10c stores the piece of data in a column for the same record in the DB 2.

Figure 2:
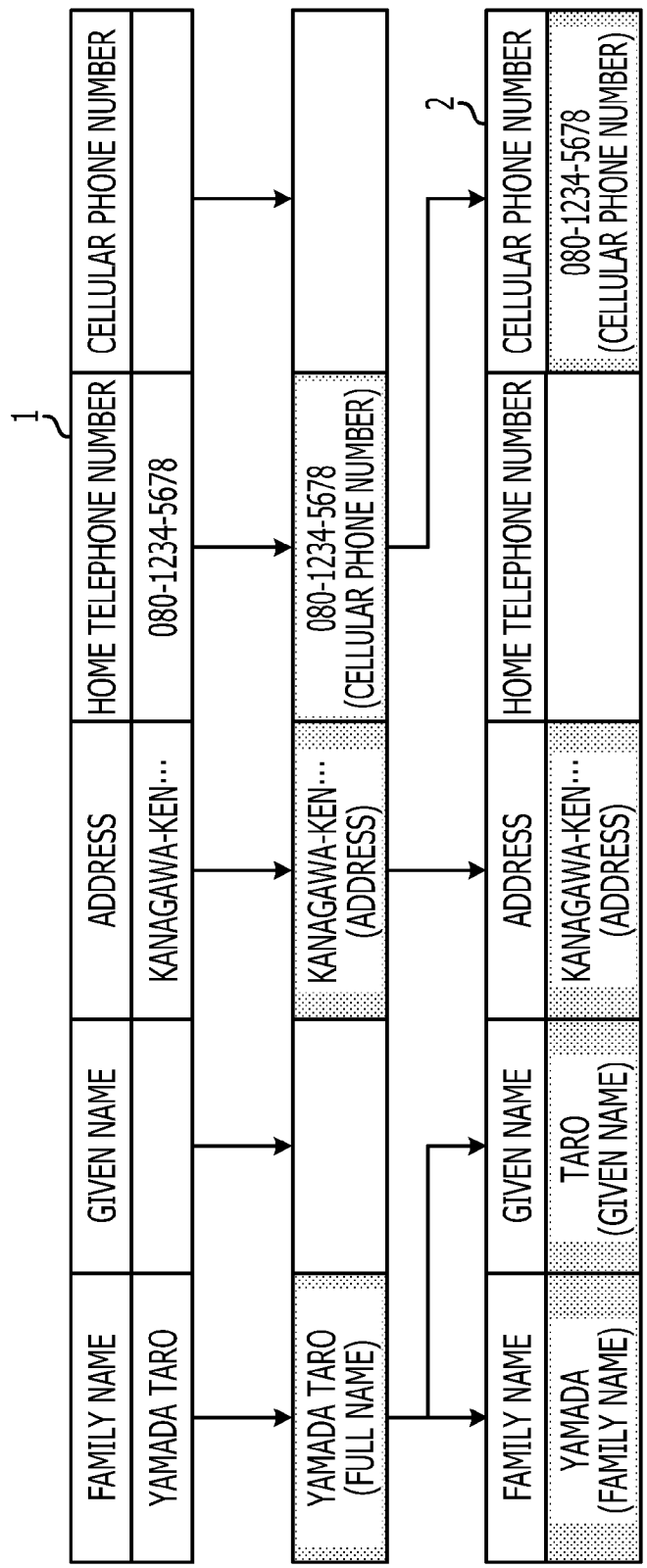
FIG. 2 is a diagram illustrating an example of adjustment.

An example of adjustment will be described with reference to FIG. 2. FIG. 2 is a diagram illustrating adjustment. As illustrated in FIG. 2, DB 1 has a record having data schema "family name", "given name", "address", "home telephone number", and "cellular phone number". Furthermore, DB 2 has data schema "family name", "given name", "address", "home telephone number", and "cellular phone number".

The read controller 10a reads a record "YAMADA Taro, -, Kanagawa-ken . . . , 080-1234-5678, -" from DB 1. Subsequently, the determination unit 10b compares data with attribute information so as to determine an attribute for each column. The determination unit 10b determines that data "YAMADA Taro" in a first column corresponds to an attribute "family name", data "Kanagawa-ken . . . " in a third column corresponds to an attribute "address", and data "080-1234-5678" in a fourth column corresponds to an attribute "cellular phone number".

Next, the arrangement controller 10c stores the determined data which have been stored in DB 1 in portions corresponding to the schema of DB 2 to generate a record. Specifically, the arrangement controller 10c stores, for the data "YAMADA Taro" in the first column corresponding to the attribute "family name", data "YAMADA" in the "family name" column of DB 2's schema and data "Taro" in the "given name" column of the DB 2's schema. Similarly, the arrangement controller 10c stores the data "Kanagawa-ken" in the third column corresponding to the attribute "address" in the "address" column of DB 2's schema, and the data "080-1234-5678" in the fourth column corresponding to the attribute "cellular phone number" in "cellular phone number" column of the DB 2's schema. In this way, the arrangement controller 10c generates a record by adjusting the arrangement of the data.

As described above, the adjustment apparatus 10 according to the first embodiment may adjust a position of data to an appropriate storage position without discarding the data even when data that does not conform to a corresponding data schema has been stored. Accordingly, since the adjustment apparatus 10 performs adjustment of data without waste, which may allow a user's intent to be taken into consideration, the quality of data may be improved.

Next, a detailed configuration of the adjustment apparatus that was described in the first embodiment and a processing flow will be described. An example wherein the adjustment apparatus includes an adjustment target DB and an adjustment destination DB is described.

Figure 3:
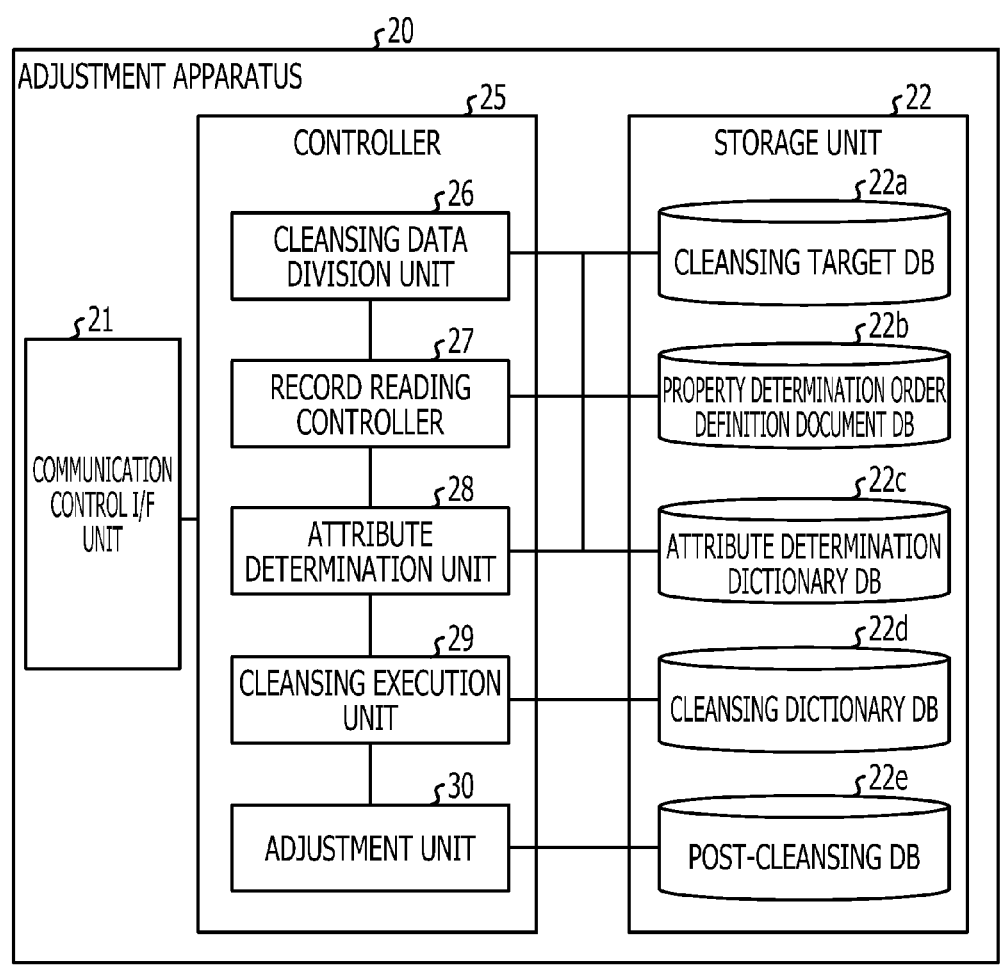
FIG. 3 is a diagram illustrating a configuration of an adjustment apparatus according to a second embodiment.

FIG. 3 is a functional block diagram illustrating a configuration of an adjustment apparatus according to a second embodiment. As illustrated in FIG. 3, an adjustment apparatus 20 includes a communication control interface (I/F) unit 21, a storage unit 22, and a controller 25. Processes performed by the adjustment apparatus 20 are not limited to those illustrated in FIG. 3 and the adjustment apparatus 20 may include a display unit, such as a display, and an input unit, such as a mouse.

Furthermore, the storage unit 22 is a storage device such as a semiconductor memory device or a hard disk. The controller 25 is an electronic circuit such as a central processing unit (CPU) or an integrated circuit such as field-programmable gate array (FPGA).

The communication control I/F unit 21 is an interface, such as a network interface card (NIC), which controls communication with another apparatus. The communication control I/F unit 21, for example, receives an instruction to start data cleansing from an administrator and transmits a cleansing result to a terminal of the administrator.

The storage unit 22 includes a work space used when processing units included in the controller 25 execute respective processes, and further includes a cleansing target DB 22a, an attribute determination order definition document DB 22b, an attribute determination dictionary DB 22c, a cleansing dictionary DB 22d, and a post-cleansing DB 22e.

The cleansing target DB 22a is a database storing records that include cleansing target data and that is composed of a plurality of columns. FIG. 4 is a diagram illustrating an example of information stored in the cleansing target DB 22a. As illustrated in FIG. 4, the cleansing target DB 22a stores a record "TOKKYO, Ichiro, Tokyo . . . , 044-1234 . . . , -", a record "SUZUKI, Hanako, Shizuoka-ken . . . , -, 090 . . . ", and a record "YAMADA Taro, -, Kanagawa-ken . . . , 080 . . . , -" that all correspond to columns "family name", "given name", "address", "home telephone number", and "cellular phone number".

In other words, in the example of FIG. 4, the data "YAMADA Taro" has been mistakenly stored in the first column "family name" of the third record. Furthermore, the data "080 . . . " is mistakenly stored in the fourth column "home telephone number" of the third record. Here, "family name", "given name", "address", "home telephone number", and "cellular phone number" are referred to as data schema, and the data stored in the columns are referred to as cleansing target data.

The attribute determination order definition document DB 22b is a database that stores a reference order for attribute determination definitions to be referred to when attributes of data to be stored in the columns are determined for each column of the data schema of the cleansing target DB 22a. FIG. 5 is a diagram illustrating an example of information stored in the attribute determination order definition document DB 22b. For example, the attribute determination order definition document DB 22b stores definitions representing "family name", "given name", and "full name" in a column "for first column" as illustrated in FIG. 5. That is, it is defined that, when determining an attribute of data stored in the first column of the cleansing target DB 22a, attribute dictionaries are referred to in order from an attribute dictionary of "family name", an attribute dictionary of "given name", to an attribute dictionary of "full name".

Furthermore, as illustrated in FIG. 5, the attribute determination order definition document DB 22b stores definitions that include "to be constituted by [0 to 9] and symbols '-' and '+'", "home telephone number (0[1–7]x[–]x[–]xxxx[–]xxxx)", and "international telephone number (+81x[–]x[–]xxxx[–]xxxx)", in a column "for fourth column". Specifically, when determining an attribute of data stored in the fourth column of the cleansing target DB 22a, first whether the information "to be constituted by [0 to 9] and symbols "–" and "+"" is satisfied is determined. Thereafter, it is determined whether the data represents a character string corresponding to one of the definitions "home telephone number", "international telephone number", "cellular phone number starting from 090", "cellular phone number starting from 080", and "telephone number for PHS" in this order. The symbol "x" illustrated in FIG. 5 represents a number from 0 to 9.

The attribute determination dictionary DB 22c is a database that associates both an attribute and attribute information, which specifies the attribute, with each other and stores the attribute and the attribute information. FIG. 6 is a diagram illustrating an example of information stored in the attribute determination dictionary DB 22c. As illustrated in FIG. 6, the attribute determination dictionary DB 22c stores attribute information that includes character type, format, maximum length, "SATO", "TOKKYO", "SUZUKI", and the like that is associated with the attribute "family name". Furthermore, the attribute determination dictionary DB 22c stores attribute information that includes character type, format, maximum length, "Taro", "Kazuo", "Ichiro", and the like that is associated with the attribute "given name". The attribute determination dictionary DB 22c stores attribute information that includes character type, format, maximum length, "Chiyoda-ku, Tokyo", "Adachi-ku, Tokyo", "Osaka-shi, Osaka-fu", and the like which is associated with the attribute "address".

In the example of FIG. 6, the attribute dictionary of "family name" defines that a determination as to whether "a predetermined character type is used" is made first, a determination as to whether "a predetermined format is used" is made second, and a determination as to whether "a maximum length of data is not larger than a predetermined value" is made third. Furthermore, the attribute dictionary for "family name" defines "SATO", "TOKKYO", "SUZUKI", and the like. Specifically, when attribute target data is stored in a predetermined format by a predetermined character type and has a length not larger than the maximum length and the data corresponds to one of "SATO", "TOKKYO", "SUZUKI", and the like, it is determined that an attribute of the data is "family name".

The cleansing dictionary DB 22d is a database that stores dictionaries used when data is cleansed. FIG. 7 is a diagram illustrating an example of information stored in the cleansing dictionary DB 22d. As illustrated in FIG. 7, the cleansing dictionary DB 22d stores information representing "SATO", "TOKKYO", "SUZUKI", "YAMADA", "TANAKA", "KONDO", and the like, which are associated with the attribute "family name", and stores "Taro", "Kazuo", "Ichiro", "Hanako", "Jiro", "Saburo", and the like, which are associated with the attribute "given name". Similarly, the cleansing dictionary DB 22d stores information representing "SATO/Taro", "SATO/Hanako", "SATO/Ichiro", . . . , "YAMADA/Taro", and the like which are associated with the attribute "full name". Similarly, the cleansing dictionary DB 22d stores information representing "Hokkaido . . . ", "Aomori-ken . . . ,", "Akita-ken . . . ", . . . , "Tokyo . . . ", "Kanagawa-ken . . . ", and the like which are associated with the attribute "address", and stores information representing "080xxxxxxxx" and the like which are associated with the attribute "cellular phone number".

The post-cleansing DB 22e is a database that stores data that has been cleansed by the controller 25 and the like. FIG. 8 is a diagram illustrating an example of information stored in the post-cleansing DB 22e. As illustrated in FIG. 8, the post-cleansing DB 22e has data schema "family name", "given name", "address", "home telephone number", and "cellular phone number". That is, attributes of columns which constitute a record of the post-cleansing DB 22e correspond to "family name", "given name", "address", "home telephone number", and "cellular phone number". Furthermore, data stored in the data schema is referred to as "cleansed data". Note that the post-cleansing DB 22e is empty until data which has been cleansed is stored, and FIG. 8 illustrates an empty data state.

The controller 25 includes an internal memory and the like, and further includes a cleansing data division unit 26, a record reading controller 27, an attribute determination unit 28, a cleansing execution unit 29, and an adjustment unit 30. The controller 25 executes data cleansing using these units.

Figure 9:
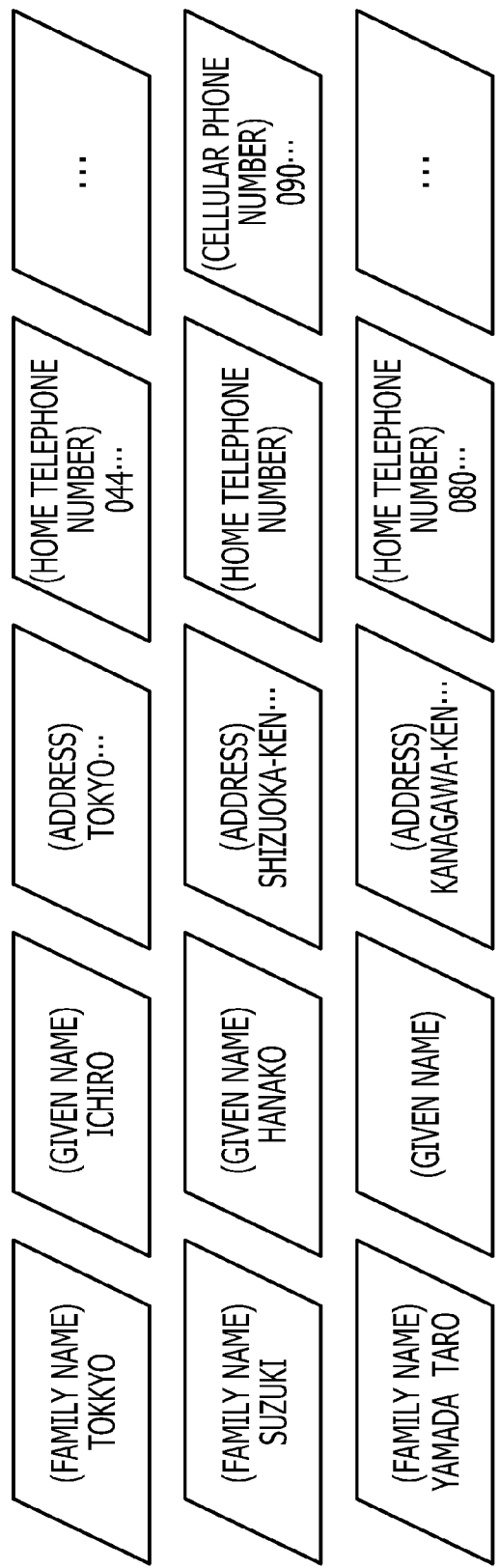
FIG. 9 is a diagram illustrating an example of data after division.

When the communication control I/F unit 21 receives an instruction to start cleansing, the cleansing data division unit 26 divides data stored in the cleansing target DB 22a among each cleansing target. For example, a case where data illustrated in FIG. 4 is divided is described. FIG. 9 is a diagram illustrating data after division. The cleansing data division unit 26 divides data included in the database illustrated in FIG. 4 according to columns and extracts "column attributes" and "data to be stored in columns", which are temporarily stored in the work space of the storage unit 22.

For example, a case where the third record illustrated in FIG. 4 is divided is described. The cleansing data division unit 26 divides the stored record "YAMADA Taro, -, Kanagawa-ken . . . , 080 . . . , -" associated with the data schema "family name, first name, address, home telephone number, cellular phone number" so as to obtain data "YAMADA Taro", "-", "Kanagawa-ken . . . ", "080 . . . ", and "-". Subsequently, the cleansing data division unit 26 associates the divided data and the attributes of the columns with each other so as to obtain data "family name: YAMADA Taro", "given name: -", "address: Kanagawa-ken . . . ", "home telephone number: 080 . . . ", and "cellular phone number: -" and temporarily stores the data in the work space of the storage unit 22.

The record reading controller 27 is a processor that reads cleansing target data divided by the cleansing data division unit 26 on a record-by-record basis. The data, which is illustrated in FIG. 9 and which is obtained after division, is described as an example. In this case, the record reading controller 27 reads the data "family name: YAMADA Taro", "given name: -", "address: Kanagawa-ken . . . ", "home telephone number: 080 . . . ", and "cellular phone number: -" as one record and outputs the data to the attribute determination unit 28. The record reading controller 27 may read starting from a leading record or starting from an arbitrary record.

The attribute determination unit 28 is a processor that determines attributes of data stored in the columns of the record read by the record reading controller 27. In the case of FIG. 9, the attribute determination unit 28 determines attributes of each of the data "family name: YAMADA Taro", "given name: -", "address: Kanagawa-ken . . . ", "home telephone number: 080 . . . ", and "cellular phone number: -".

Specifically, the attribute determination unit 28 first refers to an attribute determination dictionary for the attribute "family name" stored in the attribute determination dictionary DB 22c in accordance with a definition document for the first column of the attribute determination order definition document DB 22b for data of the first column of the record. Thereafter, when the attribute of the data is not determined, the attribute determination unit 28 next refers to an attribute determination dictionary of the attribute "given name" in accordance with the definition document for the first column. If the attribute of the data is still not determined, the attribute determination unit 28 executes a comparison process with reference to the next attribute dictionary. On the other hand, if the attribute of the data has been determined, the attribute determination unit 28 transmits a result of the determination to the cleansing execution unit 29.

For example, the attribute determination unit 28 reads the data "TOKKYO" in the first column of the first record from the work space or the like. Then, the attribute determination unit 28 reads the attribute dictionary of the attribute "family name" from the attribute determination dictionary DB 22c in accordance with the definition document for the first column. Thereafter, the attribute determination unit 28 compares the data "TOKKYO" with the attribute information "SATO", "TOKKYO", "SUZUKI", and the like which is associated with the read attribute dictionary for the attribute "family name". Since the data "TOKKYO" is included in the attribute dictionary for the attribute "family name", the attribute determination unit 28 determines that an attribute of the data "TOKKYO" is "family name".

As another example, the attribute determination unit 28 reads the data "YAMADA Taro" in the first column of the third record from the work space or the like. Then, the attribute determination unit 28 reads the attribute dictionary for the attribute "family name" from the attribute determination dictionary DB 22c in accordance with the definition document for the first column. Next, the attribute determination unit 28 compares the read data "YAMADA Taro" with the attribute information "SATO", "TOKKYO", "SUZUKI", and the like which is associated with the read attribute dictionary for the attribute "family name". Since the data "YAMADA Taro" is not included in the attribute dictionary of the attribute "family name", the attribute determination unit 28 reads the attribute dictionary of the attribute "given name" that is defined next in the definition document from the attribute determination dictionary DB 22c. Next, the attribute determination unit 28 compares the read data "YAMADA Taro" with attribute information "Taro", "Kazuo", "Ichiro", and the like that is associated with the read attribute dictionary for the attribute "given name".

Since the data "YAMADA Taro" is not included in the attribute dictionary for the attribute "given name", the attribute determination unit 28 reads the attribute dictionary for the attribute "family name" and the attribute dictionary of the attribute "given name" which serve as an attribute dictionary for the attribute "full name", which is defined next in the definition document, from the attribute determination dictionary DB 22c. Thereafter, when data "YAMADA" is included in the read attribute dictionary of the attribute "family name" and the data "Taro" is included in the attribute dictionary of the attribute "given name", the attribute determination unit 28 determines that an attribute of the data "YAMADA Taro" is "full name".

Figure 10:
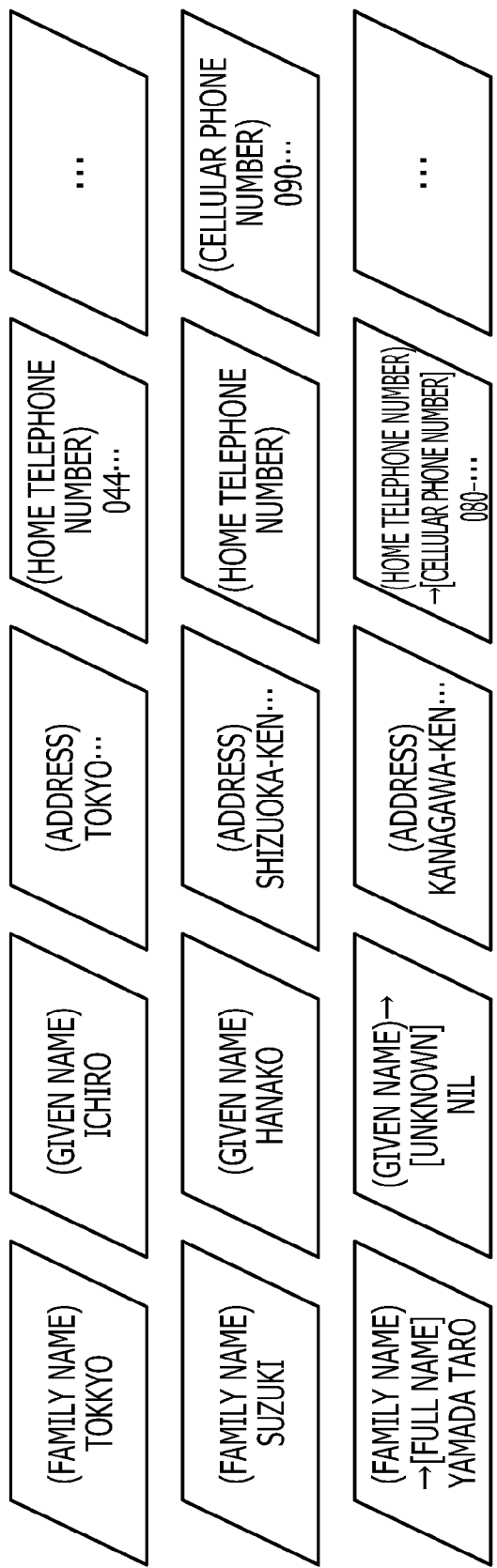
FIG. 10 is a diagram illustrating an example of data that has been subjected to attribute determination.

Results of the determinations of the attributes of the data illustrated in FIG. 9 performed by the attribute determination unit 28 are illustrated in FIG. 10. FIG. 10 is a diagram illustrating data that have been subjected to attribute determination. As illustrated in FIG. 10, for the data "YAMADA Taro" in the first column of the third record, although the attribute of the first column is "family name", an attribute of the data "YAMADA Taro" is determined to be "full name". Similarly, for the data "080 . . . " in the fourth column of the third record, although the attribute of the fourth column is "home telephone number", an attribute of the data "080 . . . " is determined to be "cellular phone number". Attributes of other data correspond to those of appropriate columns. Note that the attribute determination unit 28 stores the attribute determination results illustrated in FIG. 10 in the work space of the storage unit 22 or the like.

Referring back to FIG. 3, the cleansing execution unit 29 is a processor that executes data cleansing on data that have been subjected to attribute determination performed by the attribute determination unit 28. For example, the cleansing execution unit 29 obtains a cleansing dictionary for the attribute "family name" for data corresponding to the attribute "family name" from the cleansing dictionary DB 22d and executes data cleansing using the obtained cleansing dictionary. Similarly, the cleansing execution unit 29 obtains a cleansing dictionary for the attribute "full name" for data corresponding to the attribute "full name" from the cleansing dictionary DB 22d and executes data cleansing using the obtained cleansing dictionary.

For example, the cleansing execution unit 29 refers to the cleansing dictionary for the attribute "full name" for the data "YAMADA Taro" which corresponds to the attribute "family name and given name" and converts the data "YAMADA Taro" into "YAMADA/Taro". Furthermore, since the data "YAMADA" has been registered in the cleansing dictionary for the attribute "family name" and the data "Taro" has been registered in a cleansing dictionary for the attribute "given name", the cleansing execution unit 29 determines that an attribute for the data "YAMADA" included in the data "YAMADA/Taro" is "family name" and an attribute of the data "Taro" included in the data "YAMADA/Taro" is "given name". Similarly, the cleansing execution unit 29 refers to a cleansing dictionary for the attribute "cellular phone number" for the data "080-xxxx-xxxx", which corresponds to the attribute "cellular phone number", and converts the data "080-xxxx-xxxx" into "080xxxxxxxx".

Figure 11:
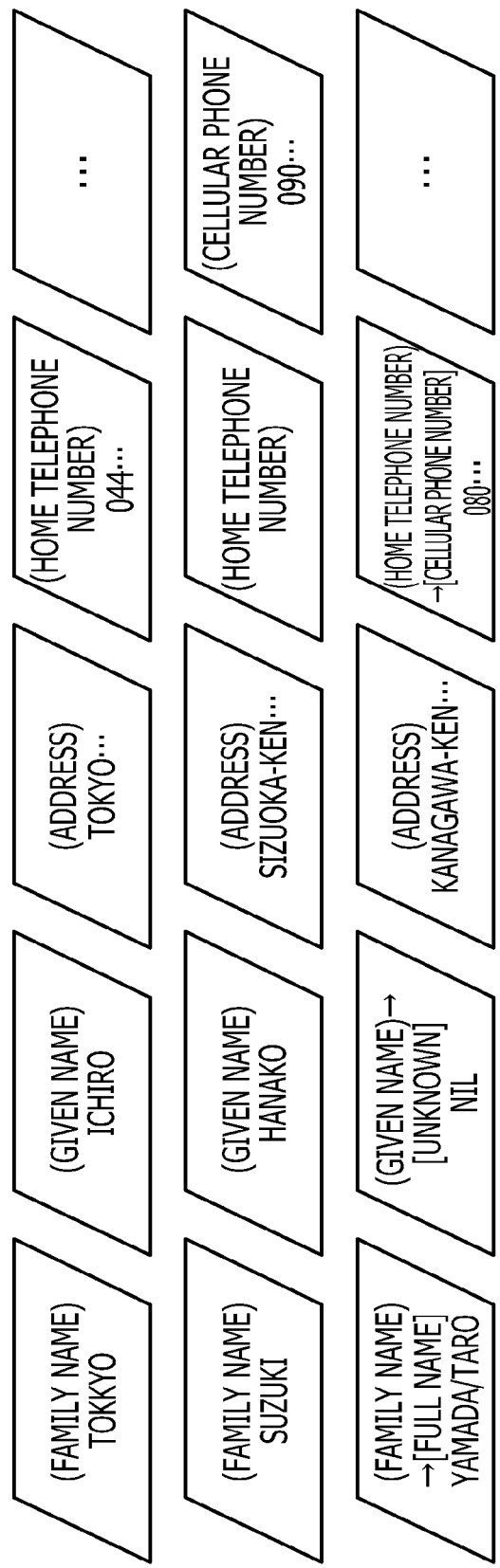
FIG. 11 is a diagram illustrating an example of data after cleansing.

The result of the cleansing, as described above, performed by the cleansing execution unit 29 on the data illustrated in FIG. 10 is illustrated in FIG. 11. FIG. 11 is a diagram illustrating an example of data after the cleansing. As illustrated in FIG. 11, the data "YAMADA Taro" in the first column of the third record is cleansed so that the data "YAMADA/Taro" is obtained. Similarly, the data "080-xxxx-xxxx" in the fourth column of the third record is cleansed so that the data "080xxxxxxxx" is obtained. Furthermore, the data "-" in the second column of the third record is cleansed so that data "unknown (NIL)" is obtained since data has not been stored in the second column of the third record. The cleansing execution unit 29 stores the cleansing results illustrated in FIG. 11 in the work space of the storage unit 22 or the like.

Referring back to FIG. 3, the adjustment unit 30 adjusts data cleansed by the cleansing execution unit 29 in accordance with the attributes determined by the attribute determination unit 28 and the data schema of the post-cleansing DB 22e.

For example, the adjustment unit 30 stores the cleansed data in accordance with the data schema of the post-cleansing DB 22e that corresponds to the attributes of the data. For example, the adjustment unit 30 stores data corresponding to the attribute "family name" in the first record of the cleansing target DB 22a in a column corresponding to the data schema "family name" selected from among the columns of the post-cleansing DB 22e. Furthermore, the adjustment unit 30 stores data corresponding to the attribute "home telephone number" in the first record of the cleansing target DB 22a in a column corresponding to the data schema "home telephone number" selected from among the columns of the post-cleansing DB 22e. Specifically, the adjustment unit 30 stores data that belongs to the same record in the cleansing target DB 22a in the same record in the post-cleansing DB 22e.

An example of a result of adjustment of the data illustrated in FIG. 11 performed by the adjustment unit 30 is illustrated in FIG. 12. FIG. 12 is a diagram illustrating an example of data adjustment. Note that FIG. 12 illustrates information stored in the post-cleansing DB 22e. When FIGS. 11 and 12 are compared with each other, for the data "YAMADA/Taro" that corresponds to the attribute "full name" in the third record of FIG. 11, the adjustment unit 30 stores the data "YAMADA" in the column "family name" and the data "Taro" in the column "given name". Similarly, the adjustment unit 30 stores the data "080 . . ." that corresponds to the attribute "cellular phone number" in the third record of FIG. 11 in the column "cellular phone number" instead of the column "home telephone number".

Next, an example of data adjustment process will be described in detail with reference to FIGS. 13 to 15. Here, a first processing example will be described with reference to FIG. 13, a second processing example will be described with reference to FIG. 14, and a third processing example will be described with reference to FIG. 15.

Figure 13:
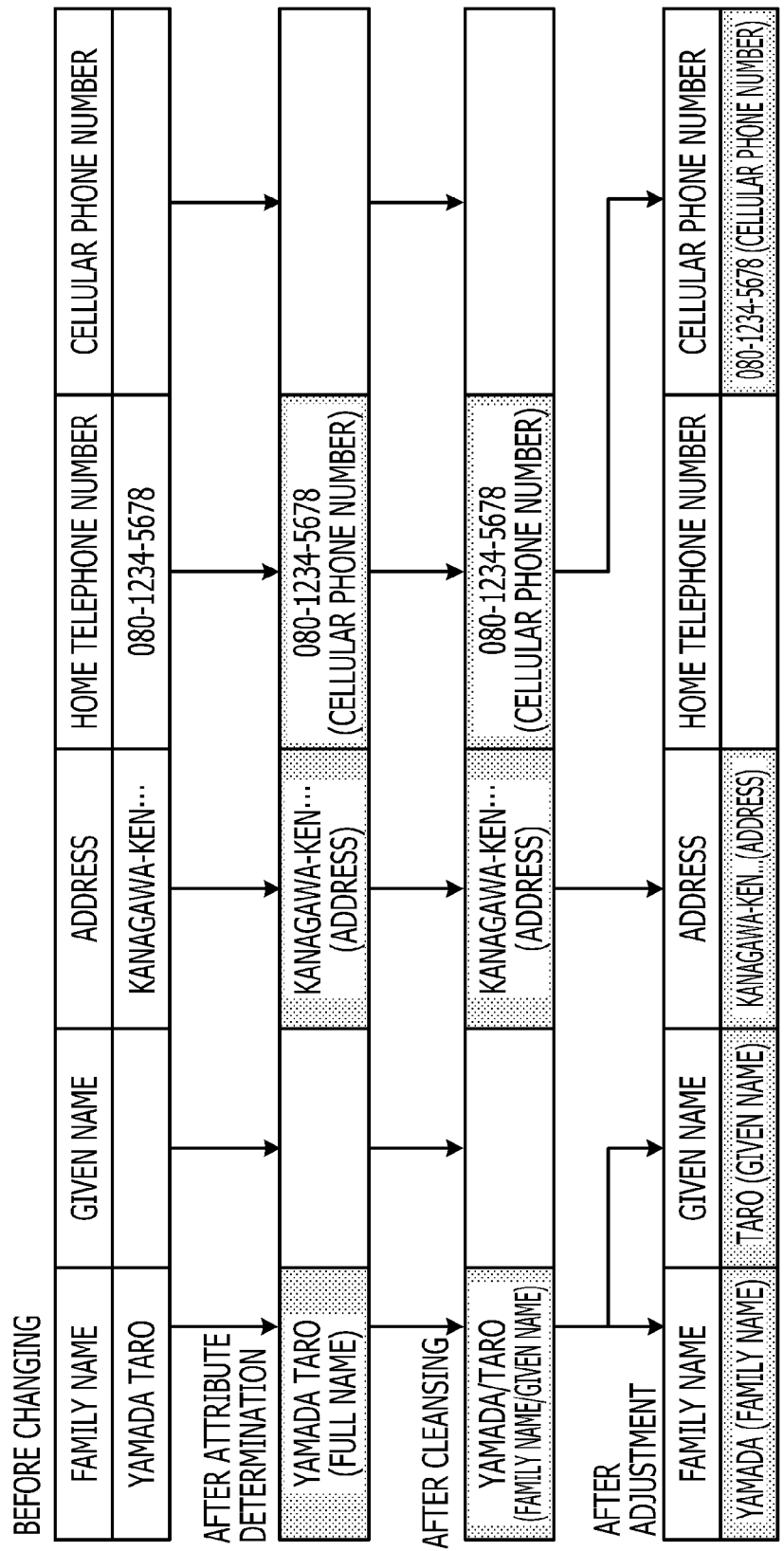
FIG. 13 is a diagram illustrating a first processing example that includes attribute determination, cleansing, and adjustment performed in this order.

FIG. 13 is a diagram illustrating a first example of a process that includes attribute determination, cleansing, and the adjustment performed in this order. As illustrated in FIG. 13, the cleansing target DB 22a of the adjustment apparatus 20 stores the record "YAMADA Taro, -, Kanagawa-ken . . . , 080-1234-5678, -", which corresponds to the data schema "family name, given name, address, home telephone number, cellular phone number". The symbol "-" represents no data.

In this state, the cleansing data division unit 26 divides the record "YAMADA Taro, -, Kanagawa-ken . . . , 080-1234-5678, -" into data "YAMADA Taro", "-", "Kanagawa-ken . . . ", "080-1234-5678", and "-". Subsequently, the record reading controller 27 reads this record from the cleansing target DB 22a.

Thereafter, the attribute determination unit 28 refers to the attribute determination dictionaries in accordance with the reference order of the attribute determination definition document for the first column so as to determine that the data "YAMADA Taro" in the first column corresponds to the attribute "full name". Similarly, the attribute determination unit 28 refers to the attribute determination dictionaries in accordance with the reference order of the attribute determination definition document for the third column so as to determine that the data "Kanagawa-ken . . ." in the third column corresponds to the attribute "address". Similarly, the attribute determination unit 28 refers to the attribute determination dictionaries in accordance with the reference order of the attribute determination definition document for the fourth column so as to determine that the data "080-1234-5678" in the fourth column corresponds to the attribute "cellular phone number".

Subsequently, the cleansing execution unit 29 performs data cleansing using the cleansing dictionary for the attribute "full name" on the data "YAMADA Taro" that corresponds to the attribute "family name and given name" so as to convert the data "YAMADA Taro" into data "YAMADA/Taro". Similarly, the cleansing execution unit 29 performs data cleansing using the cleansing dictionary for the attribute "address" on the data "Kanagawa-ken . . ." that corresponds to the attribute "address". Similarly, the cleansing execution unit 29 performs data cleansing using the cleansing dictionary for the attribute "cellular phone number" on the data "080-1234-5678" that corresponds to the attribute "cellular phone number" so as to convert the data "080-1234-5678" into "08012345678".

Thereafter, the adjustment unit 30 stores the data "YAMADA", which is obtained by performing cleansing on the data "YAMADA Taro" and which corresponds to the attribute "family name", in a column "family name" in the data schema for post-cleansing. Furthermore, the adjustment unit 30 stores the data "Taro", which is obtained by performing the cleansing on the data "YAMADA Taro" and which corresponds to the attribute "given name", in a column "given name" in the data schema for post-cleansing. Similarly, the adjustment unit 30 stores the data "Kanagawa-ken . . .", which is obtained by performing the cleansing and which corresponds to the attribute "address", in a column "address" included in the data schema for post-cleansing. Similarly, the adjustment unit 30 stores the data "08012345678", which is obtained by performing cleansing and which corresponds to the attribute "cellular phone number", in a column "cellular phone number" included in the data schema for post-cleansing.

Specifically, the adjustment apparatus 20 divides the data "YAMADA Taro", which had been stored in the column "family name" before the adjustment process, into data "YAMADA" and data "Taro" in the adjustment process, and stores "YAMADA" in the column "family name" and "Taro" in the column "given name". Similarly, the adjustment apparatus 20 stores the data "080-xxxx-xxxx" which has been stored in the column "home telephone number" before the adjustment process into the column "cellular phone number" in the adjustment process.

Figure 14:
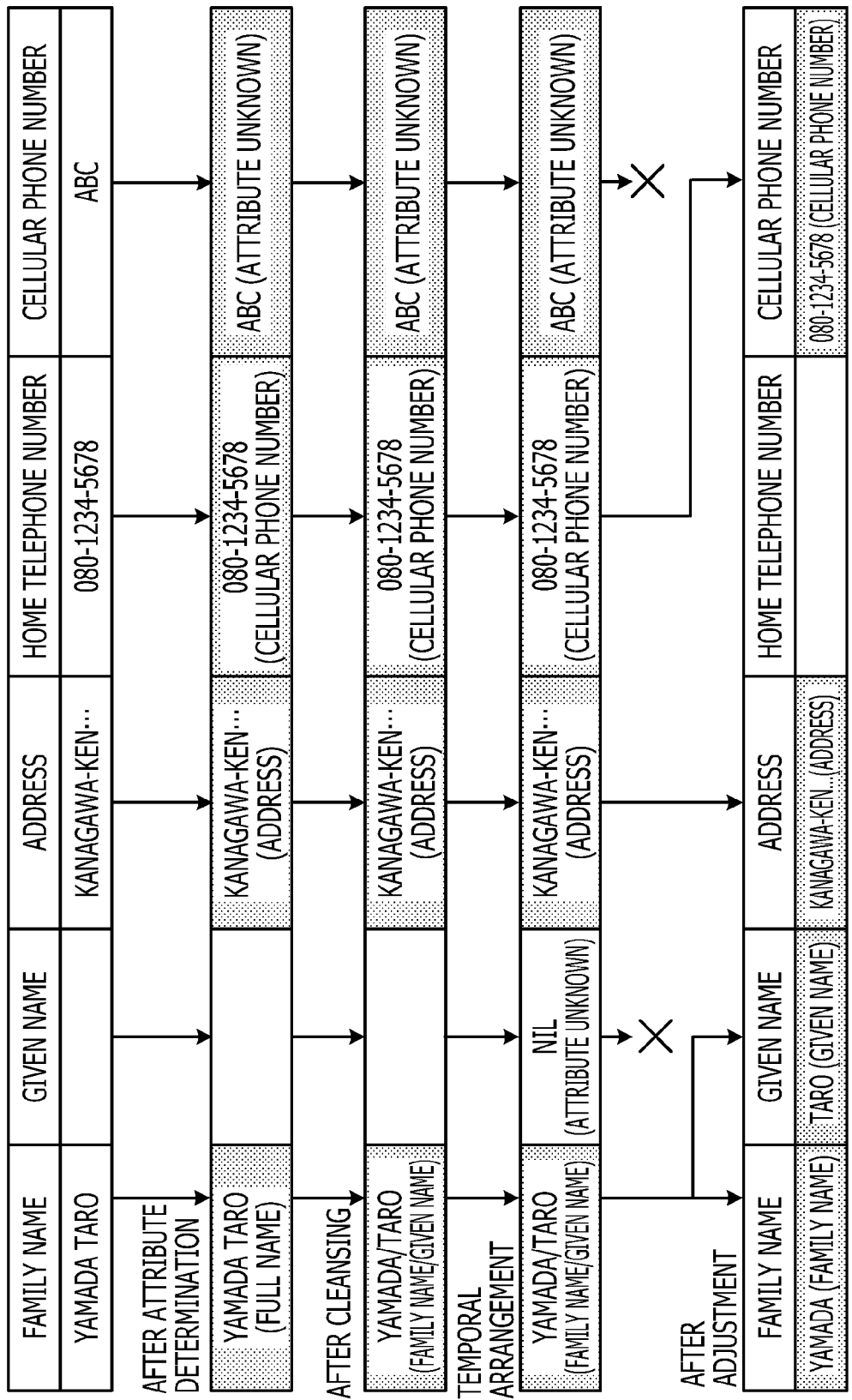
FIG. 14 is a diagram illustrating a second processing example that includes attribute determination, cleansing, and adjustment performed in this order.

FIG. 14 is a diagram illustrating a second example of the process that includes attribute determination, cleansing, and adjustment performed in this order. The process illustrated in FIG. 14 is different from the process illustrated in FIG. 13 in that a process referred to as "temporary arrangement" is performed after cleansing. As illustrated in FIG. 14, the cleansing target DB 22a of the adjustment apparatus 20 stores a record "YAMADA Taro, -, Kanagawa-ken . . . , 080-1234-5678, abc" that corresponds to data schema "family name, given name, address, home telephone number, cellular phone number", respectively. The symbol "-" represents no data.

In this state, the cleansing data division unit 26 divides the record "YAMADA Taro, -, Kanagawa-ken . . . , 080-1234-5678, abc" into data "YAMADA Taro", "-", "Kanagawa-ken . . . ", "080-1234-5678", and "abc". Subsequently, the record reading controller 27 reads this record from the cleansing target DB 22a.

Next, the attribute determination unit 28 refers to the attribute determination dictionaries in accordance with the reference order in the attribute determination definition document for the first column so as to determine that the data "YAMADA Taro" in the first column corresponds to the attribute "full name". Similarly, the attribute determination unit 28 refers to the attribute determination dictionaries in accordance with the reference order in the attribute determination definition document for the third column so as to determine that the data "Kanagawa-ken . . . " in the third column corresponds to the attribute "address". Similarly, the attribute determination unit 28 refers to the attribute determination dictionaries in accordance with the reference order in the attribute determination definition document for the fourth column so as to determine that the data "080-1234-5678" in the fourth column corresponds to the attribute "cellular phone number". Similarly, the attribute determination unit 28 refers to the attribute determination dictionaries in accordance with the reference order in the attribute determination definition document for the fifth column so as to determine that the data "abc" in the fifth column corresponds to an attribute "unknown". That is, it is assumed that the data "abc" in the fifth column is not defined in any of the attribute dictionaries.

Subsequently, the cleansing execution unit 29 performs data cleansing using the cleansing dictionary for the attribute "full name" on the data "YAMADA Taro" that corresponds to the attribute "family name and given name" so as to convert "YAMADA Taro" into "YAMADA/Taro". Similarly, the cleansing execution unit 29 performs data cleansing using the cleansing dictionary for the attribute "address" on the data "Kanagawa-ken . . . " that corresponds to the attribute "address". Similarly, the cleansing execution unit 29 performs data cleansing using the cleansing dictionary for the attribute "cellular phone number" on the data "080-1234-5678" that corresponds to the attribute "cellular phone number" so as to convert "080-1234-5678" into "08012345678". The data "abc" in the fifth column is left as an unknown attribute.

Thereafter, the adjustment unit 30 performs temporary arrangement on the data that has been subjected to the cleansing. Specifically, the adjustment unit 30 temporarily determines that the data "YAMADA/Taro" that corresponds to the attribute "family name/given name" is stored in the first column, the data "NIL" that corresponds to the attribute "unknown" is stored in the second column, and the data "Kanagawa-ken . . . " that corresponds to the attribute "address" is stored in the third column. Furthermore, the adjustment unit 30 temporarily determines that the data "08012345678" that corresponds to the attribute "cellular phone number" is stored in the fourth columns and the data "abc" corresponding to the attribute "unknown" is stored in the fifth columns.

Thereafter, the adjustment unit 30 stores the data "YAMADA", which corresponds to the attribute "family name" included in the temporarily-determined data "YAMADA/Taro", in the "family name" column for the post-cleansing data schema. Furthermore, for the data "Taro" corresponding to the attribute "given name" included in the temporarily-determined data "YAMADA/Taro", the adjustment unit 30 determines that "NIL (attribute unknown)" has been temporarily assigned to the column corresponding to the data schema "given name" that is included in the data schema for post-cleansing and that is to be a storage destination for "Taro". However, since the adjustment unit 30 gives data that has a clear attribute priority over data that has an unknown attribute, the data "Taro" is stored in the "given name" column for the post-cleansing data schema.

Furthermore, the adjustment unit 30 stores the temporarily-determined data "Kanagawa-ken . . . " in the "address" column of the post-cleansing data schema because it is determined that the data "Kanagawa-ken . . . " corresponds to the attribute "address". Moreover, the adjustment unit 30 determines that, although the temporarily-determined data "08012345678" corresponds to the attribute "cellular phone number", the data "abc (attribute unknown)" has been temporarily assigned to the "cellular phone" column of the post-cleansing data schema that is to be a storage destination of the data "08012345678". However, since the adjustment unit 30 gives data having a clear attribute priority over data that has an unknown attribute, the data "08012345678" is stored in the "cellular phone number" column of the post-cleansing data schema. Note that the adjustment unit 30 discards the data "abc (attribute unknown)" since the attribute of the data "abc" is unknown and therefore a storage destination is not specified.

As a result, the adjustment apparatus 20 determines attributes of the cleansing target data and rearranges the data in storage destinations corresponding to the determined attributes.

Figure 15:
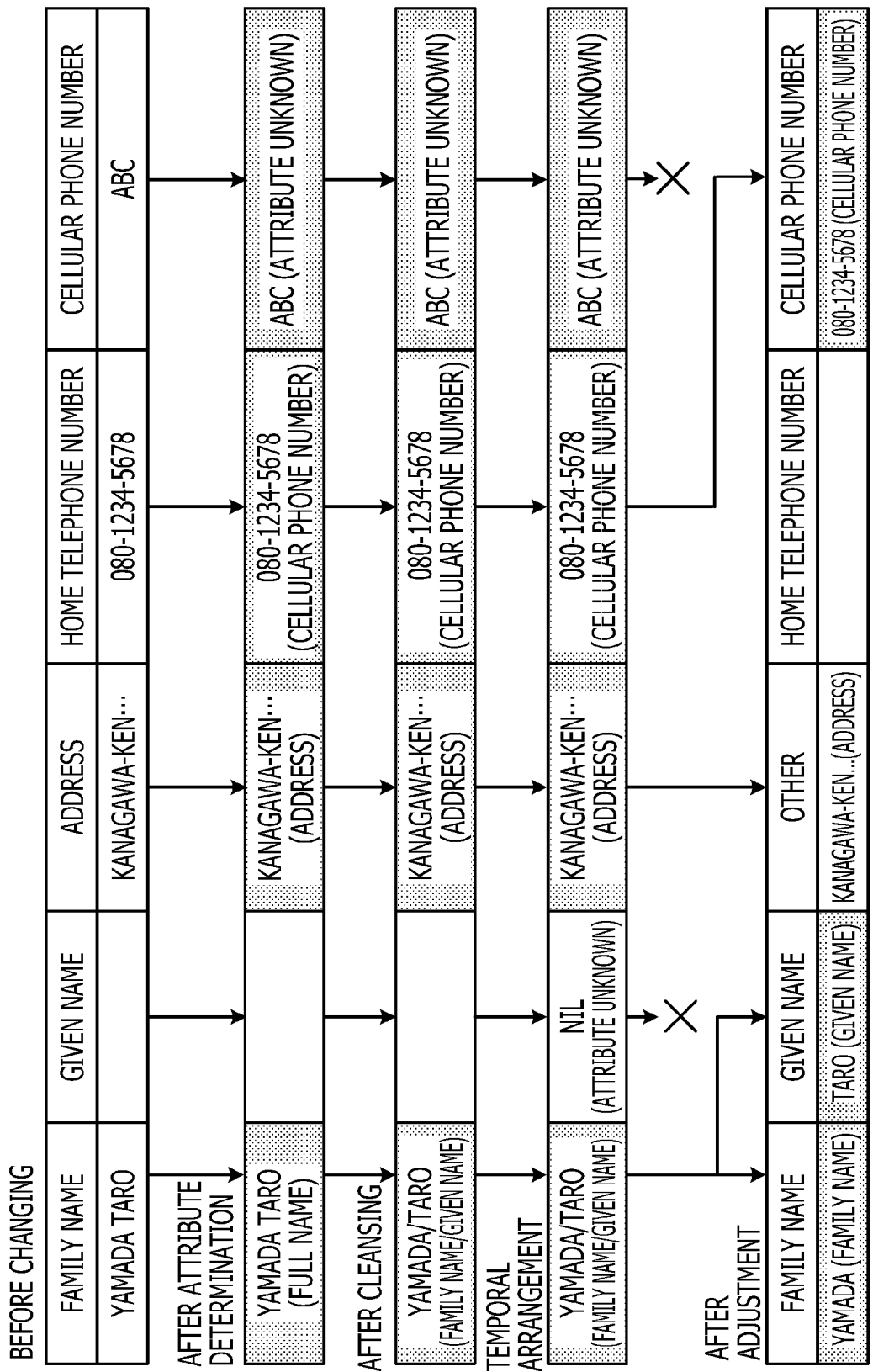
FIG. 15 is a diagram illustrating a third processing example that includes attribute determination, cleansing, and adjustment performed in this order.

FIG. 15 is a diagram illustrating a third example of the process that includes attribute determination, cleansing, and adjustment performed in this order. The process illustrated in FIG. 15 is different from the process illustrated in FIG. 13 in that the schema of the cleansing target database is different from the schema of the post-cleansing database. As illustrated in FIG. 15, the cleansing target DB 22*a* of the adjustment apparatus 20 stores the record "YAMADA Taro, -, Kanagawa-ken . . . , 080-1234-5678, abc", which corresponds to the data schema "family name, given name, address, home telephone number, cellular phone number". The symbol "-" represents no data.

In this state, a cleansing data division process, an attribute determination process, a cleansing process, and a temporary arrangement process performed by the adjustment apparatus 20 are the same as those illustrated with reference to FIG. 14, and therefore descriptions thereof are omitted.

After the temporary arrangement process, the adjustment unit 30 stores the data "YAMADA", which corresponds to the attribute "family name" included in the temporarily-determined data "YAMADA/Taro", in the column "family name" of the post-cleansing data schema. Furthermore, the adjustment unit 30 determines that "NIL (attribute unknown)" has been temporarily assigned in the column "given name" of the post-cleansing data schema that is to be a storage destination of the data "Taro", which corresponds to the attribute "given name" included in the temporarily-determined data "YAMADA/Taro". However, since the adjustment unit 30 gives data that has a clear attribute priority over data that has an unknown attribute, the data "Taro" is stored in the column "given name" of the post-cleansing data schema.

Furthermore, the adjustment unit 30 determines that, although the data "Kanagawa-ken . . . " corresponds to the attribute "address", a column "address" of the post-cleansing data schema does not exist. The adjustment unit 30 then determines that the data "Kanagawa-ken . . . " has been stored in a column between the column "given name" and the column "home telephone number" as the cleansing target data. The adjustment unit 30 then determines that a column "other" positioned between the column "given name" and the column "home telephone number" of the post-cleansing data schema is to be a storage destination of the data "Kanagawa-ken . . . " and stores the data "Kanagawa-ken . . . " in the "other" column. In this case, the attribute of the column that stores the data "Kanagawa-ken . . . " is "other" and the attribute of the data "Kanagawa-ken . . . " is "address". Therefore, the attribute of the column and the attribute of the data are different from each other.

Furthermore, the adjustment unit 30 determines that, although the data "08012345678" corresponds to the attribute "cellular phone number", the data "abc (attribute unknown)" has been temporarily assigned to the column "cellular phone number" of the post-cleansing data schema, which is to be a storage destination of the data "08012345678". However, since the adjustment unit 30 gives data having a clear attribute priority over data having an unknown attribute, the data "08012345678" is stored in the column "cellular phone number" of the post-cleansing data schema. The adjustment unit 30 discards the data "abc (attribute unknown)" since the attribute of the data "abc" is unknown and a storage destination thereof is not specified.

As described above, the adjustment apparatus 20 may store appropriate data in an appropriate column that takes the configuration of schema or columns into consideration, even when the schema of cleansing target data and the schema of post-cleansing data are different from each other.

Figure 16:
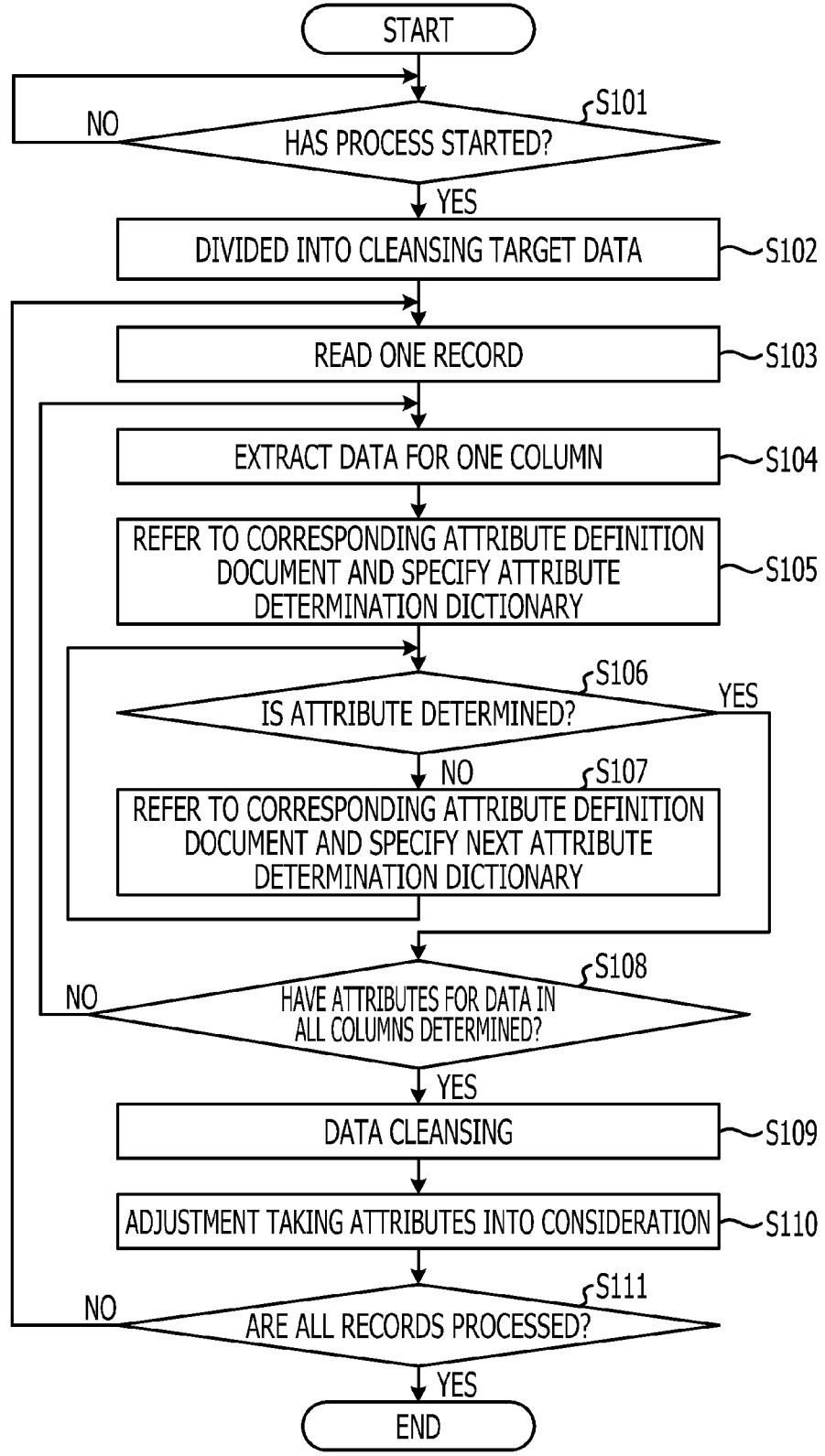
FIG. 16 is a flowchart illustrating a process executed by the adjustment apparatus.

Next, a flow of a process executed by the adjustment apparatus 20 will be described. FIG. 16 is a flowchart illustrating a process executed by the adjustment apparatus 20.

As illustrated in FIG. 16, when an instruction to start the process is received ("yes" in S101), the cleansing data division unit 26 of the adjustment apparatus 20 divides cleansing target data stored in the cleansing target DB 22a on a column-by-column basis (in S102).

Subsequently, the record reading controller 27 reads data divided by the cleansing data division unit 26 that corresponds to one record (in S103), and the attribute determination unit 28 extracts data for one column from the record (in S104).

Then, from among the attribute determination order definition documents stored in the attribute determination order definition document DB 22b, the attribute determination unit 28 refers to an attribute determination order definition document that corresponds to the column in which the extracted data had been stored, so as to specify a corresponding attribute determination dictionary stored in the attribute determination dictionary DB 22c (in S105). Subsequently, the attribute determination unit 28 determines an attribute of the extracted data using the specified attribute determination dictionary (in S106). If the attribute is not determined ("no" in S106), the attribute determination unit 28 specifies a next attribute determination dictionary selected in accordance with the attribute determination order definition document (in S107) and the process in S106 onwards is performed again.

When the attribute is determined ("yes" in S106), the attribute determination unit 28 determines whether attributes of data in all the columns of the read record have been determined (in S108). If an attribute of data in at least one column has not been determined ("no" in S108), the attribute determination unit 28 performs the process in S104 to S108 again.

When the attributes of the data in all the columns of the read record have been determined ("yes" in S108), the cleansing execution unit 29 performs data cleansing using the cleansing dictionaries corresponding to the specified attributes for individual columns (in S109). Next, the adjustment unit 30 associates the data of the read record with columns that correspond to the attributes of the data of the data schema for the post-cleansing DB 22e and stores the data (in S110).

Next, the adjustment apparatus 20 executes the process in S103 to S111 on all records included in the cleansing target DB 22a. When adjustment is completed ("yes" in S111), the process is terminated. However, when at least one of the records included in the cleansing target DB 22a has not been subjected to adjustment ("no" in S111), the adjustment apparatus 20 executes the process in S103 onwards.

As described above, when data is to be cleansed, the adjustment apparatus 20 according to the first embodiment determines the attributes of the cleansing target data so as to determine whether the data is suitable for the cleansing process to be applied. In accordance with the result of the determination, the adjustment apparatus 20 may perform appropriate cleansing. Furthermore, the adjustment apparatus 20 may determine whether an attribute assigned to a cleansing result is appropriate for a data storage position so that data may be stored in an appropriate location. As a result, data stored in databases may have high quality and the data may be efficiently used.

For example, an actual data attribute that preferably does not match a corresponding schema definition is assigned to cleansed data. Making use of this, searching a dirty database in which data for family names, such as "YAMADA" and "YAMADA Taro", are repeatedly stored in the wrong column, the adjustment apparatus 20 obtains a search result that includes attributes that have been assigned to a searching target record. In this way, the adjustment apparatus 20 may achieve high-quality searching with ease when improper data is included in a column corresponding to the attribute "family name".

In this way, analysis of the association between an added data attribute and a schema definition may be used to profile data that creeps into an incorrect column, for example, a degree of creepage or tendency to creep. Furthermore, the adjustment apparatus 20 may be effectively used in not only a data cleansing field but also data processing that does not include cleansing and which uses natural sentences in inputs as long as attribute determination of actual data is executed and mapping is performed in accordance with the attribute.

Above, the embodiments of the present disclosure have been described, but the present disclosure may be employed in various embodiments other than the foregoing embodiments. Therefore, another embodiment will be described below.

Although an example where data cleansing is executed after attributes of data are determined has been described with the first embodiment, the present disclosure is not limited to this and the processes may be performed in arbitrary order. For example, the data cleansing may be executed after adjustment is completed in accordance with results of an attribute determination, and the data cleansing may be performed on data that has not been subjected to the attribute determination. Here, an example where the data cleansing is performed on data that has not been subjected to attribute determination is described.

Figure 17:
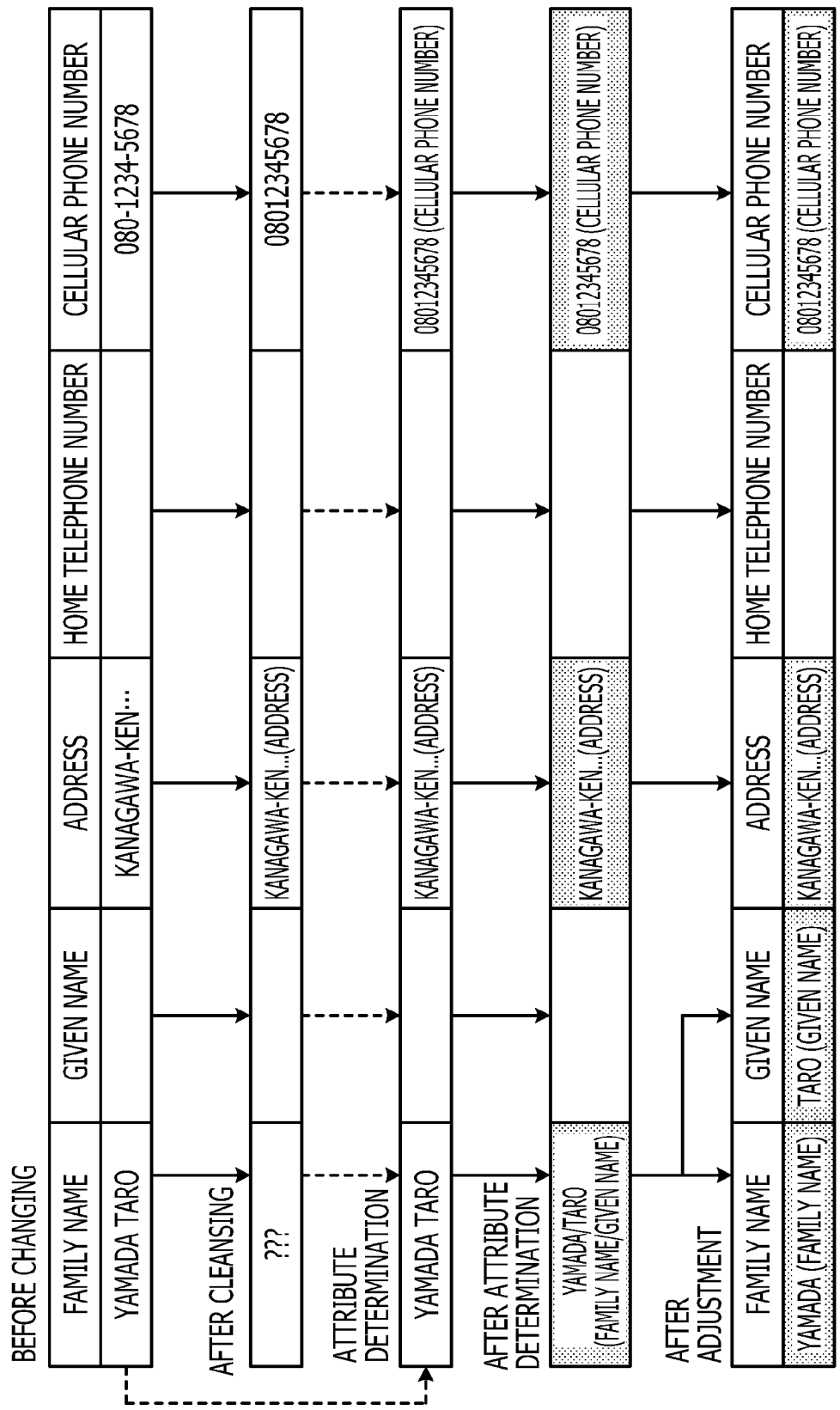
FIG. 17 is a diagram illustrating an example of a process that performs cleansing, attribute determination, and data rearrangement in this order.

FIG. 17 is a diagram illustrating a process of performing cleansing, attribute determination, and adjustment in this order. As illustrated in FIG. 17, a cleansing target DB 22a of a data arrangement change apparatus 20 stores a record "YAMADA Taro, -, Kanagawa-ken . . . , -, 080-1234-5678" that corresponds to the data schema "family name, given name, address, home telephone number, cellular phone number". The symbol "-" represents no data.

In this state, a cleansing data division unit 26 divides the record "YAMADA Taro, -, Kanagawa-ken . . . , -, 080-1234-5678" into data "YAMADA Taro", "-", "Kanagawa-ken . . . ", "-", and "080-1234-5678". Subsequently, a record reading controller 27 reads the data for this record from the cleansing target DB 22a.

Subsequently, as with the method described above, a cleansing execution unit 29 cleans the data stored in columns using cleansing dictionaries that correspond to attributes of the columns. Consequently, the cleansing execution unit 29 converts the record "YAMADA Taro, -, Kanagawa-ken . . . , -, 080-1234-5678" into a record "???, -, Kanagawa-ken . . . , -, 08012345678". Specifically, the cleansing execution unit 29 stores the data "???" since the data in the first column is not recognized when using a cleansing dictionary that corresponds to attribute "family name" for the first column.

Thereafter, an attribute determination unit 28 determines attributes of the data of the columns via the same method described above. Here, since the cleansing result of the first column is the data "???", the attribute determination unit 28 reads the data "YAMADA Taro", which has not been subjected to cleansing, from the cleansing target DB 22a and determines the attribute of the data "YAMADA Taro". Note that the adjustment process that is to be executed is the same as that of the first embodiment, and therefore a description thereof is omitted.

As described above, the adjustment apparatus 20 may execute the data cleansing at an arbitrary time. Accordingly, when the data cleansing is executed first on a database that includes data mistakenly stored or data mistakenly input, the processing load of an adjustment process may be reduced.

When each of the attribute determination dictionaries described in the first embodiment has columns "family name", "given name", and "address", for example, attribute dictionaries may be generated by combining attributes of the columns, such as attribute dictionaries for attributes "family name", "given name", "address", "full name", "family name and address", and "given name and address", and such dictionaries may be used. Furthermore, although the attribute dictionaries and the cleansing dictionaries are separately provided in the first embodiment, the present disclosure is not limited to this and the same dictionaries may be used.

Figure 18:
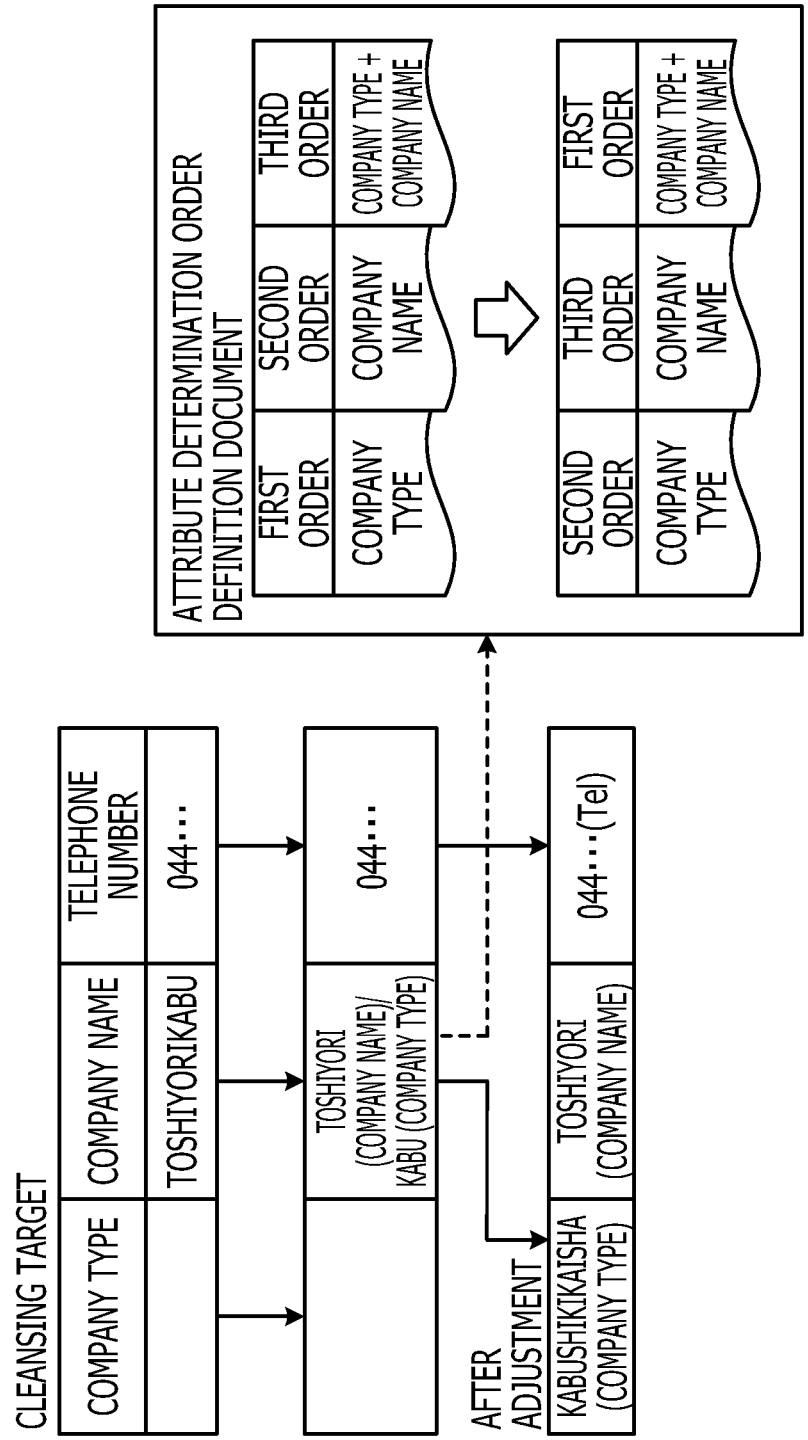
FIG. 18 is a diagram illustrating an example of a process to dynamically change the order of attribute determination.

Although an example where the order is assigned to the attribute determination order definition documents has been described in the first embodiment, the present disclosure is not limited to this and the configuration of columns and the like may be dynamically changed. FIG. 18 is a diagram illustrating a process of dynamically changing attribute determination order. As illustrated in FIG. 18, the cleansing target DB 22a of the data arrangement change apparatus 20 stores a record "-, Toshiyorikabu, 044 . . . " that corresponds to columns "company type, company name, telephone number". The symbol "-" represents no data.

When attribute determination is performed in this state, the attribute determination unit 28 first reads data in the first column. However, since data is not stored in the first column, the attribute determination unit 28 determines that an attribute of the first column is "attribute unknown". Next, the attribute determination unit 28 reads the data "Toshiyorikabu" in the second column and refers to an attribute determination order definition document that corresponds to the second column.

Here, the attribute determination order definition document that is referred to includes information "first order: company type", "second order: company name", and "third order: company type+company name". However, since the first column that is adjacent to the second column is empty, the attribute determination unit 28 determines that an attribute dictionary for "company type+company name", which is a combination of an attribute of the first column and an attribute of the second column, is to be referred to first. That is, the attribute determination unit 28 changes the content of the definition of the attribute determination order definition document to information "second order: company type", "third order: company name", and "first order: company type+company name" and uses the attribute determination dictionaries in accordance with the changed order.

Then the attribute determination unit 28 divides the data "Toshiyorikabu" in the second column into data "Toshiyori" that has an attribute "company name" and data "Kabu" that has an attribute "company type". Then, the cleansing execution unit 29 changes the data "Kabu" into data "Kabushiki-kaisha". Then an adjustment unit 30 stores the data "Kabushikikaisha", which has the attribute "company type" in the second column, in a column that, after the cleansing, corresponds to the attribute "company type". Similarly, the adjustment unit 30 stores the data "Toshiyori" that has the attribute "company name", which had been stored in the second column, in a column that, after cleansing, corresponds to the attribute "company name", and stores data "044 . . . " in an appropriate column.

As described above, in a case where it is highly possible that data has been stored in an incorrect position, such as where data is not stored in a column adjacent to a column where certain data is stored, the attribute determination unit 28 dynamically changes the order of definitions in the attribute determination order definition document. Accordingly, the attribute determination unit 28 may quickly specify an attribute of data that is probably stored in an incorrect column. Furthermore, although a situation where data is not stored in a preceding column of a certain column has been described in this embodiment, the same process may be employed in a situation where data is not stored in a succeeding column of the certain column.

Although an example where data stored in a database is subjected to adjustment and cleansing has been described in the first embodiment, the present disclosure is not limited to this and a variety of data such as data stored in another storage apparatus and data input by a client computer may be subjected to adjustment and cleansing.

Figure 19:
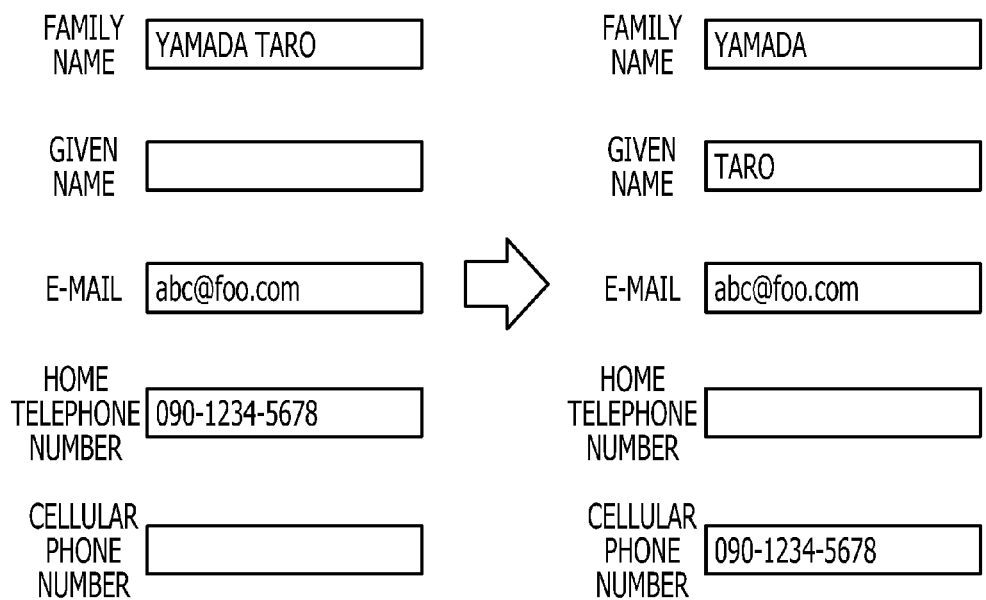
FIG. 19 is a diagram illustrating an example applicable to online shopping.

FIG. 19 is a diagram illustrating application to on-line shopping. It is assumed that, as illustrated in FIG. 19, the adjustment apparatus 20 displays an input screen that includes input boxes "family name", "given name", "email", "home telephone number", and "cellular phone number" in a client apparatus and accepts an input of a record "YAMADA Taro, -, abc@foo.com, 090-1234-5678, -". Then the adjustment apparatus 20 executes the attribute determination described above using the record "YAMADA Taro, -, abc@foo.com, 090-1234-5678, -" as a cleansing target and using columns "family name", "given name", "email", "home telephone number", and "cellular phone number".

As a result, the adjustment apparatus 20 may adjust the record "YAMADA Taro, -, abc@foo.com, 090-1234-5678, -" to obtain a record "YAMADA, Taro, abc@foo.com, -, 090-1234-5678". As described above, the adjustment apparatus 20 may process data for on-line shopping or the like in real time.

Furthermore, among the processes described in the foregoing embodiments, all or part of the processes that are automatically performed may be manually performed. Conversely, among the processes described in the foregoing embodiments, all or part of the processes which are manually performed may be automatically performed. Furthermore, the processing procedure, the control procedure, specific names, and information including various data and parameters may be arbitrarily changed unless otherwise specified.

Moreover, the components included in the devices illustrated in the drawings are functional concepts and it is not necessarily the case that the devices are physically configured as illustrated in the drawings. In other words, concrete examples of distribution and integration of the devices are not limited to those illustrated in the drawings. That is, all or some of the devices may be functionally or physically configured in a distributed manner or an integrated manner in an arbitrary unit depending on various loads and usage states. Furthermore, all or some of the processing functions performed by the devices may be realized by a CPU and programs analyzed and executed by the CPU or may be realized as wired logic hardware.

The various processes described foregoing embodiments may be realized by executing programs provided in advance in a computer system such as a personal computer or a work station. Therefore, a computer system that executes programs having functions the same as those of the foregoing embodiments will be described as an example below.

Figure 20:
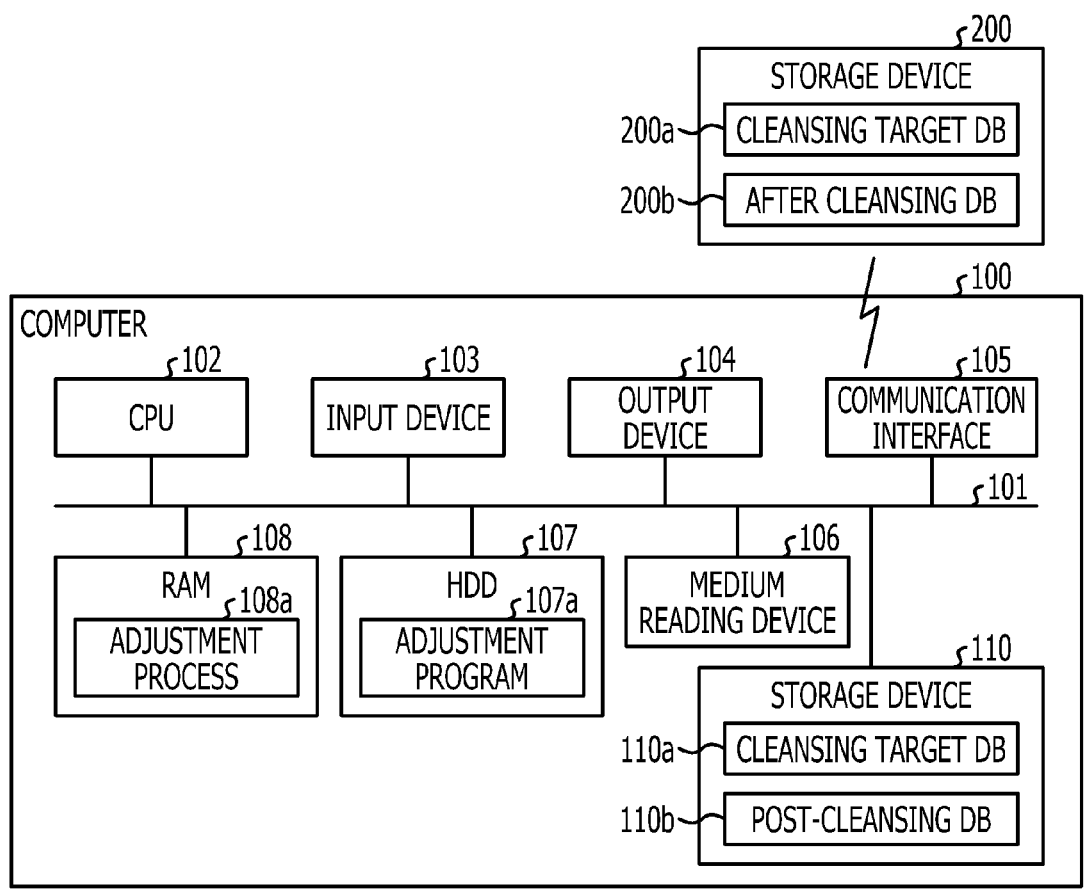
FIG. 20 is a diagram illustrating an example of a hardware configuration of a computer that executes an adjustment program.

FIG. 20 is a diagram illustrating a hardware configuration of a computer that executes an adjustment program. As illustrated in FIG. 20, a computer 100 includes a CPU 102, an input device 103, an output device 104, a communication interface 105, a medium reading device 106, a hard disk drive (HDD) 107, a random access memory (RAM) 108, and a storage device 110. The units illustrated in FIG. 20 are connected to one another through a bus 101.

The input device 103 may be a mouse or a keyboard, the output device 104 may be a display, and the communication interface 105 may be an interface such as a network interface card (NIC). The HDD 107 may store the variety of information that is stored in the storage unit 22 illustrated in FIG. 3 along with an adjustment program 107a. Although the HDD 107 is taken as an example of a recording medium, various programs may be stored in a computer readable recording medium, such as a read only memory (ROM), a RAM, or a CD-ROM, and the various programs may be read by the computer 100. The storage device 110 includes a cleansing target DB 110a, which stores information similar to that stored in the cleansing target DB 22a illustrated in FIG. 3, and a post-cleansing DB 110b, which stores information similar to that stored in the post-cleansing DB 22e. Note that the storage medium may be located far away from the computer 100 and the computer 100 may access the storage medium to obtain the programs. In this case, the obtained programs may be stored in a recording medium included in the computer 100.

The CPU 102 is an example of the processor in this embodiment, and a micro processing unit (MPU) may be used.

The CPU 102 activates an adjustment process 108a that executes the functions described with reference to FIG. 3 and the like by reading the adjustment program 107a and deploying the adjustment program 107a in the RAM 108. In other words, the adjustment process 108a executes functions similar to those of the cleansing data division unit 26, the record reading controller 27, the attribute determination unit 28, the cleansing execution unit 29, and the adjustment unit 30, which are illustrated in FIG. 3. As described above, the computer 100 operates as an information processing apparatus that executes an adjustment method by reading and executing a program.

For example, the adjustment process 108a operated by the CPU 102 reads a record that includes a plurality of columns from the HDD 107. The adjustment process 108a determines, when data stored in one of the columns of the read record does not have an attribute that corresponds to the column, whether the attribute of the data corresponds to one of the other columns. As a result of the determination, when the determination is affirmative, the adjustment process 108a places the data in the appropriate one or more columns.

As another example, the adjustment process 108a operated by the CPU 102 reads a record that includes a plurality of columns from the cleansing target DB 110a of the storage device 110. Thereafter, the adjustment process 108a determines, when data stored in one of the columns of the read record does not have an attribute that corresponds to the column, whether the attribute of the data corresponds to another column. As a result of the determination, when the determination is affirmative, the adjustment process 108a generates the post-cleansing DB 110b by placing the data in the other column.

Furthermore, the adjustment process 108a may cleanse data in an external storage device 200 through the communication interface 105. The storage device 200 includes a cleansing target DB 200a, which stores information similar to that stored in the cleansing target DB 22a illustrated in FIG. 3, and a post-cleansing DB 200b, which stores information similar to that stored in the post-cleansing DB 22e. In this state, the adjustment process 108a reads a record that includes a plurality of columns from the cleansing target DB 200a included in the external storage device 200. The adjustment process 108a determines, when data stored in one of the columns of the read record does not have an attribute corresponding to the column, whether the attribute of the data corresponds to another column. As a result of the determination, when the determination is affirmative, the adjustment process 108a generates the post-cleansing DB 200b by placing the data in the other column.

Moreover, the computer 100 may realize functions similar to those of the foregoing embodiments by causing the medium reading device 106 to read the adjustment program 107a from the recording medium and to execute the adjustment program 107a. The programs in this embodiment may be preferred not to be executed by the computer 100. For example, present disclosure is similarly applicable to a case where another computer or another server executes the programs or a case where a computer and a server execute the programs in combination.

Accordingly, the data cleansing may prevent data that is stored in an incorrect column from becoming noise.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable recording medium storing an adjustment program that causes a computer to execute a process, the process comprising:

reading a record that includes a plurality of columns from a storage device;

determining whether data stored in a certain column in the plurality of columns of the read record has an attribute that corresponds to another column in the plurality of columns, when the data does not have an attribute that corresponds to the certain column;

assigning the data to the another column when it is determined that the data has the attribute that corresponds to the another column; and determining whether the data has an attribute that is obtained by combining the attribute of the certain column and the attribute of the another column with each other.

2. The recording medium according to claim 1, wherein the another column is adjacent to the certain column.

3. The recording medium according to claim 1, wherein the process further includes:
   determining whether the data has the attribute that corresponds to the another column after the assigning is performed.

4. An adjustment method comprising:
   reading a record that includes a plurality of columns from a storage device;
   determining whether data stored in a certain column in the plurality of columns of the read record has an attribute that corresponds to another column in the plurality of columns when the data does not have an attribute that corresponds to the certain column, by a processor;
   assigning the data to the another column when it is determined that the data has the attribute that corresponds to the another column; and
   determining whether the data has an attribute that is obtained by combining the attribute of the certain column and the attribute of the another column with each other.

5. The adjustment method according to claim 4, wherein the another column is adjacent to the certain column.

6. The adjustment method according to claim 4, further comprising:
   determining whether the data has the attribute that corresponds to the another column after the assigning is performed.

7. An adjustment apparatus comprising:
   a memory; and
   a processor coupled to the memory and configured to:
   obtain a record from a storage device which stores the record that includes a plurality of columns;
   determine whether data stored in a certain column in the columns of the read record has an attribute that corresponds to a another column in the plurality of columns when the data does not have an attribute that corresponds to the certain column;
   assign the data to the another column when it is determined that the data has the attribute that corresponds to the another column; and
   determine whether the data has an attribute that is obtained by combining the attribute of the certain column and the attribute of the another column with each other.

8. The adjustment apparatus according to claim 7, wherein the another column is adjacent to the certain column.

9. The adjustment apparatus according to claim 7, wherein the processor is further configured to:
   determine whether the data has the attribute that corresponds to the another column after the assigning is performed.

* * * * *